United States Patent [19]
Ando et al.

[11] Patent Number: 5,901,268
[45] Date of Patent: May 4, 1999

[54] DRIVE CONTROL APPARATUS FOR BRUSHLESS MOTOR

[75] Inventors: Kouji Ando; Kzuyoshi Horiuchi; Shinichi Ohi; Hiroshi Ohsawa, all of Konan, Japan

[73] Assignee: Zexel Corporation, Tokyo, Japan

[21] Appl. No.: 09/018,965

[22] Filed: Feb. 5, 1998

[30] Foreign Application Priority Data

Feb. 7, 1997 [JP] Japan ..................................... 9-39883

[51] Int. Cl.$^6$ ...................................................... H02P 5/17
[52] U.S. Cl. ...................... 388/811; 318/254; 318/138; 318/439; 318/811
[58] Field of Search .................................. 318/254, 138, 318/439, 811; 388/811

[56] References Cited

U.S. PATENT DOCUMENTS 4,494,055  1/1985  Bitting et al. .......................... 318/254
5,602,448  2/1997  Yaguchi ................................. 318/139

*Primary Examiner*—Karen Masih
*Attorney, Agent, or Firm*—Wenderoth, Lind & Ponack, L.L.P.

[57] ABSTRACT

In order to prevent the performance of a motor from deteriorating due to a change in which the rotation rate of its rotor is to be increased suddenly, in a brushless motor in which a drive pulse whose pulse width is modulated in correspondence to a rotation rate setting signal input from the outside is formed and switching control is performed on the current supplied to the exciting coils by using output signals from the Hall elements that detect the position of the rotor and the drive pulse, the pulse width of the drive pulse is changed gradually and greatly until it reaches the pulse width that corresponds to the rotation rate setting signal when the upward change in the rotation rate of the rotor is to be large.

18 Claims, 14 Drawing Sheets

DRIVE CONTROL APPARATUS FOR BRUSHLESS MOTOR

BACKGROUND OF THE INVENTION

The present invention relates to a drive control apparatus for a brushless motor that performs duty ratio control of the brushless motor by modulating the pulse width of a drive pulse in correspondence to the setting for the rotation rate.

Methods for controlling the speed of a brushless motor include the one disclosed in Japanese Unexamined Patent Publication No. H 5-34781, which implements speed control by changing the pulse width of a drive pulse supplied to the exciting coils in order to apply a rotating magnetic field to the rotor through pulse-width modulation (PWM), for instance. In this pulse-width modulation, a triangular wave having a specific frequency is compared with a threshold value corresponding to the rotation rate that has been set, and if the rotation rate setting is smaller, the pulse width (duty ratio) of the drive pulse is reduced to lower the rotating speed of the rotor, whereas if the rotation rate setting is larger, the pulse width (duty ratio) of the drive pulse is increased to raise the rotating speed of the rotor.

However, it has been confirmed that a rush current Ia, as indicated with the one-point chain line in FIG. 7(c), is generated at the time of a rise of the source if the source is cut off for a short period of time for any reason in a motor that is rotating. This phenomenon occurs because, when the source is cut off for a short time, the voltage (the voltage at the threshold value and the like) in the signal systems that form the drive pulse does not fall off immediately due to the influence of the capacitative elements in the circuit, and when the source rises again, the motor tries to start rotating abruptly at a duty ratio level as high as that before the cut-off. If the source is cut off for a long time, on the other hand, the individual signal systems enter states similar to their initial states and when the source rises again it will be similar to a regular startup. The generation of such a rush current greatly affects the setting of the maximum rated current for the switching elements (FETs) that switch on / off the power supply to the exciting coils.

In addition, at a startup of the motor, i.e., when the motor that has been in a stopped state is to be started up, if the triangular wave and the threshold value corresponding to the rotation rate setting are simply compared, as in the prior art, to form a drive pulse, the motor will try to start rotating abruptly at a pulse width that corresponds to the rotation rate setting at the time of power up. Consequently, power is supplied to the exciting coils wound around the stator suddenly, which causes immediate repulsion from, and attraction to the permanent magnets of the rotor, to distort various portions of the motor, resulting in magnetic noise being generated.

Furthermore, it has been confirmed that when the value of the setting for the rotation rate is suddenly increased, a strong magnetic field is generated at the exciting coils, resulting in an increase in motor noise.

The common problem in the phenomena described above is that when there is a demand for a sudden upward change in the rotation rate of the rotor, the performance of the motor deteriorates due to the generation of a rush current, with abnormal noise and the like.

SUMMARY OF THE INVENTION

Accordingly, an object of the present invention is to provide a drive control apparatus for a brushless motor that is capable of minimizing a reduction in the performance of the motor which would otherwise be caused by a change such as a sudden increase in the rotation rate of the rotor.

In addition, it has been verified that when the value of the rotation rate setting is reduced slowly, the state in which the rotor rotates through inertia becomes disrupted, resulting in a state in which motor braking occurs, thereby increasing the motor sound, and in order to achieve the object described above, this point too, must be taken into consideration.

In order to achieve the object described above, the drive control apparatus for a brushless motor according to the present invention comprises a rotor provided with permanent magnets, a stator provided is with exciting coils wound around it for generating a rotating magnetic field in order to cause the rotor to rotate, Hall elements for detecting the position of the rotor, a switching device that switches the direction of the current supplied to the exciting coils, a drive control device that implements switching control for the means for switching by using output signals from the Hall elements and also controls the level of current supplied to the exciting coils by using a drive pulse, a pulse-width modulation device that determines the pulse width of the drive pulse with a setting signal for setting the rotation rate of the rotor and modulates the pulse width by changing the setting signal, and a device for pulse width gradual increase that, when an upward change in the rotor rotation rate is called for, gradually implements a large change in the pulse width of the drive pulse until it reaches the pulse width that corresponds to the setting signal.

Consequently, when the rotor rotation rate is to be increased greatly, such as when the source rises after a temporary cut-off, at motor startup, when the setting for the rotation rate is increased and the like, the pulse width of the drive pulse is gradually increased by the device for pulse width gradual increase until the pulse width that corresponds to the rotation rate setting signal is reached, and the rotation rate of the rotor is gently increased until it reaches the rotation rate setting.

In one of the modes in which a large increase in the rotor rotation rate is called for, i.e., when the source rises after a temporary cut-off, since the voltage in the signal systems that form the rotation rate drive pulse is still present at the time of the rise, the control at a startup or the control that is normally performed when the value setting is changed cannot be employed as usual, and it is necessary to change the threshold value that corresponds to the rotation rate setting in synchronization with the rise of the source.

Namely, the drive control apparatus for a brushless motor that meets the requirement described above must be provided with a rotor having permanent magnets, a stator having exciting coils wound around it for generating a rotating magnetic field for causing the rotor to rotate, Hall elements that detect the position of the rotor, a switching device that switches the current supplied to the exciting coils, a pulse-width modulation device having an oscillation circuit that generates an oscillation pulse having a specific frequency, which forms a drive pulse through comparison of the oscillation pulse output from the oscillation circuit and a threshold value that corresponds to the rotation rate setting and modulates the pulse width of the drive pulse by changing the threshold value, a drive control that performs switching control device of the means for switching by using output signals from the Hall elements and controls the level of current supplied to the exciting coils with the drive pulse and a device for pulse width gradual increase that changes the threshold value in the direction in which the pulse width is contracted when the source rises after a temporary cut-off and causes it to gradually approach the level that corresponds to the rotation rate setting by using a specific time constant.

In more specific terms, a structure may be adopted in which the pulse-width modulation device compares a triangular wave having a specific frequency with the threshold value that corresponds to the rotation rate setting, selects a period of the triangular wave over which its level exceeds the threshold value as a pulse width and modulates the pulse width of the drive pulse by changing the threshold value and the device for pulse width gradual increase raises the level of the threshold value when the source rises after a temporary cut-off and gradually reduces it to the level that corresponds to the rotation rate setting by using a specific time constant.

Consequently, when the source rises after it has been temporarily cut-off, the threshold is temporarily increased, thereby contracting the pulse width of the drive pulse, after which it gradually returns to the pulse width that corresponds to the rotation rate setting. Thus, no sudden large current runs to the exciting coils when the source rises, and the exciting current, too, rises gently so that the rotation of the rotor gradually gains speed until it regains the state that it was in before the cutoff.

In one of the modes in which a large increase in the rotor rotation rate is called for, i.e., when the motor is started up from a stopped state, it is desirable during the initial stage of startup to gradually adjust the level of the threshold value from the level at which the pulse width is 0 to the level corresponding to the rotation rate setting by using a specific time constant. In more specific terms, a structure may be adopted in which the pulse-width modulation device compares a triangular wave having a specific frequency with the threshold value corresponding to the rotation rate setting, selects a period of the triangular wave over which its level exceeds the threshold value as a pulse width and modulates the pulse width of the drive pulse by changing the threshold value, and the device for pulse width gradual increase gradually reduces the level of the threshold value which is at or over the peak level of the triangular wave at the rise of the source during a startup to the level that corresponds to the rotation rate setting by using a specific time constant.

In such a structure, since the threshold value becomes gradually reduced from the level at or over the peak of the triangular wave to the level corresponding to the rotation rate setting at a startup of the motor, the pulse width of the drive pulse gradually increases from a 0 state (duty ratio =0%) to the width corresponding to the rotation rate setting, which results in a gentle increase in the power supply to the exciting coils at a startup, i.e., a gentle increase in the rotation rate of the rotor.

While the motor is in a stopped state with the voltage that sets the rotation rate of the motor (rotation setting voltage) set at 0 V (GND voltage) before a startup, in some applications, noise may be imposed upon the rotation setting voltage or the GND voltage may fluctuate, depending upon the installation location. The noise level is likely to be high when the source of a vehicle is utilized, and although the motor is set in a stopped state, such noise may cause it to start to rotate. In order to deal with this problem, it is desirable to ensure that the drive pulse is not formed unless the rotation setting voltage exceeds a rotation start decision-making voltage by setting the rotation setting voltage for setting the rotation rate of the motor at a stopped-state voltage during a stopped state and comparing the rotation setting voltage with the rotation start decision-making voltage which is higher than the stopped-state voltage. In this structure, since the motor does not rotate unless the rotation setting voltage exceeds the rotation start decision-making voltage, the motor never rotates due to noise or fluctuation in the GND voltage before a startup.

In addition, in one of the modes in which a large increase in the rotor rotation rate is called for, i.e., when the value of the rotation rate setting is increased, it is desirable to gradually adjust the threshold value from the level before changing the setting toward the level corresponding to the rotation rate setting after changing the setting by using a specific time constant when the rotation rate setting is increased. In more specific terms, a structure may be adopted in which the pulse-width modulation device compares a triangular wave having a specific frequency with a threshold value corresponding to the rotation rate setting, selects a period of the triangular wave over which its level exceeds the threshold value as a pulse width and modulates the pulse width of the drive pulse by changing the threshold value, and the device for pulse width gradual increase gradually reduces the threshold value from the level before the change in the setting to the level corresponding to the rotation rate setting after the change in the setting by using a specific time constant when the setting for rotation rate is increased.

As a result, since the threshold value becomes gradually reduced from the level before the change in the setting toward the level after the change in the setting, the pulse width of the drive pulse is not changed abruptly as the setting for the rotation rate is changed, but rather increases gradually to gently shift to the new value set for the rotation rate.

It is to be noted that while the setting for the rotation rate is increased with the threshold value gently changed as described earlier, when the setting for the rotation rate is to be reduced, it is desirable to instantly change the threshold value from the level before the change in the setting to the level corresponding to the rotation rate setting after the change in the setting. In other words, when the setting for the rotation rate is to be reduced, the threshold value may be increased instantly from the level before the change in the setting to the level corresponding to the rotation rate setting after the change in the setting, to instantly contract the pulse width of the drive pulse. Since the pulse width of the drive pulse is suddenly contracted as the setting for the rotation rate is changed in this manner, the rotation rate of the rotor gradually slows under its own inertia until a rotation rate equal to the rotation rate setting after the change in the setting is achieved.

The structure described above may be realized by calculating the level of the threshold value and the like using the input information such as the setting signal for setting the rotation rate based upon a program provide in a microcomputer, or it may be constituted exclusively with electrical circuits without using a microcomputer.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings, which illustrate preferred embodiment. In the drawings.

DETAILED DESCRIPTION OF THE PREFERRED EMBODIMENT

The following is an explanation of an embodiment of the present invention in reference to the drawings.

Figure 1:
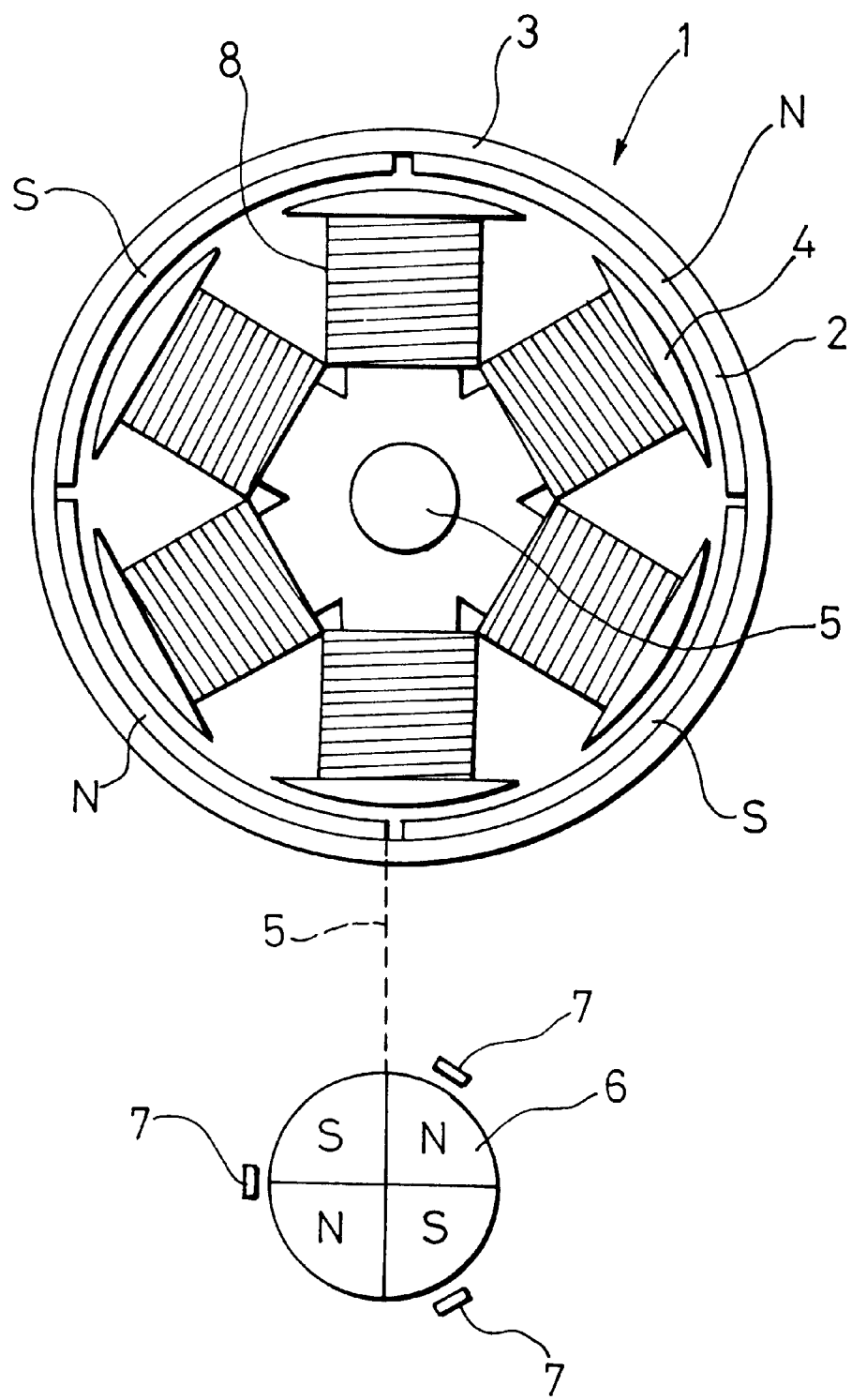
FIG. 1 is a schematic block diagram of the brushless motor in an embodiment of the present invention.

FIG. 1 shows a three-phase brushless motor 1 which is controlled by the control apparatus for a brushless motor according to the present invention. This brushless motor 1 comprises a rotor 3 and a stator 4, with the rotor 3 caused to rotate by a rotating magnetic field generated at the stator 4 for the rotor 3 which is provided with permanent magnets 2 at its internal circumferential surface that faces opposite the external circumferential surface of the stator 4, positioned in such a manner that their N poles and S poles are arranged alternately along the direction in which the rotor 3 rotates. In addition, rotor magnets 6 for detecting the position of the rotor 3 are secured to one end of a rotating shaft 5 which, in turn, is secured to the rotor 3, and Hall elements 7 that detect changes of the magnetic poles of the rotor magnets 6 are provided in the vicinity of the rotor magnets 6. Exciting coils 8 that are wound around the individual arms of the stator 4 comprise three exciting coils U, V and W and, in this embodiment, the three exciting coils U, V and W are delta-connected. It is to be noted that the exciting coils U, V and W may instead be star-connected.

Figure 2:
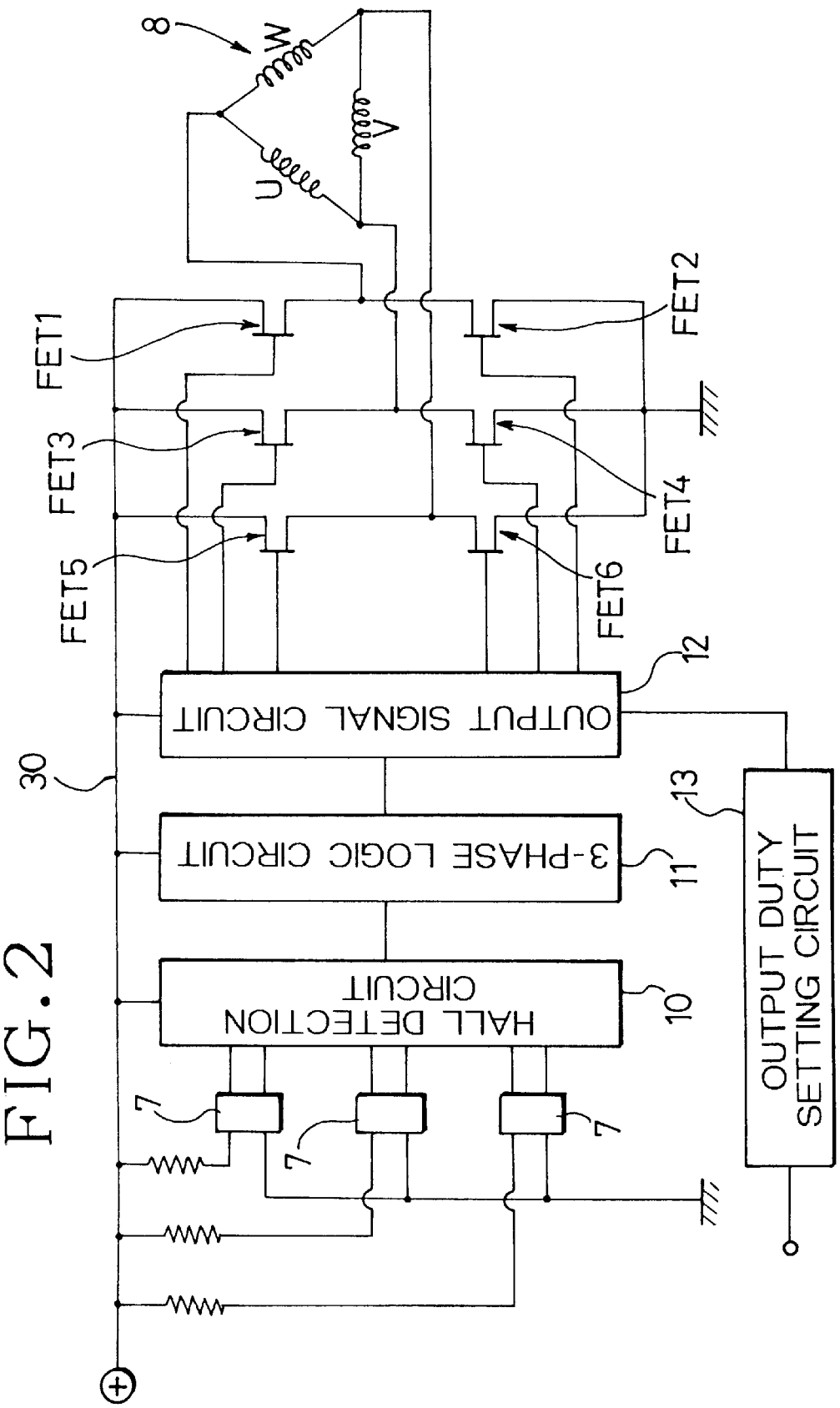
FIG. 2 is an electrical circuit diagram illustrating a portion of the brushless motor control apparatus in the embodiment of the present invention.

The control apparatus that controls the brushless motor 1 structured as described above may be constituted as shown in FIG. 2, comprising a Hall detection circuit 10 that detects signals from the Hall elements 7, a three-phase logic circuit 11 that sets the order in which power is supplied to the individual exciting coils U, V and W based upon a signal received from the Hall detection circuit 10, and an output signal circuit 12 that controls a switching that switches the direction in which current is supplied to the exciting coils U, V and W by using a power supply timing signal provided by the three-phase logic circuit 11 and an output duty signal Pd provided by an output duty setting circuit 13 which is to be detailed below. The switching device is constituted by providing three sets of field effect transistors in parallel between a source line 30 connected to a power supply, such as a battery, and ground, with each set comprising two field effect transistors that are connected in series between the source line 30 and ground, and with the individual terminals of the exciting coils U, V and W that are delta-connected respectively connected between the serially connected field effect transistors, i.e., between the FETs 1 and 2, between FETs 3 and 4, and between FETs 5 and 6.

Figure 3:
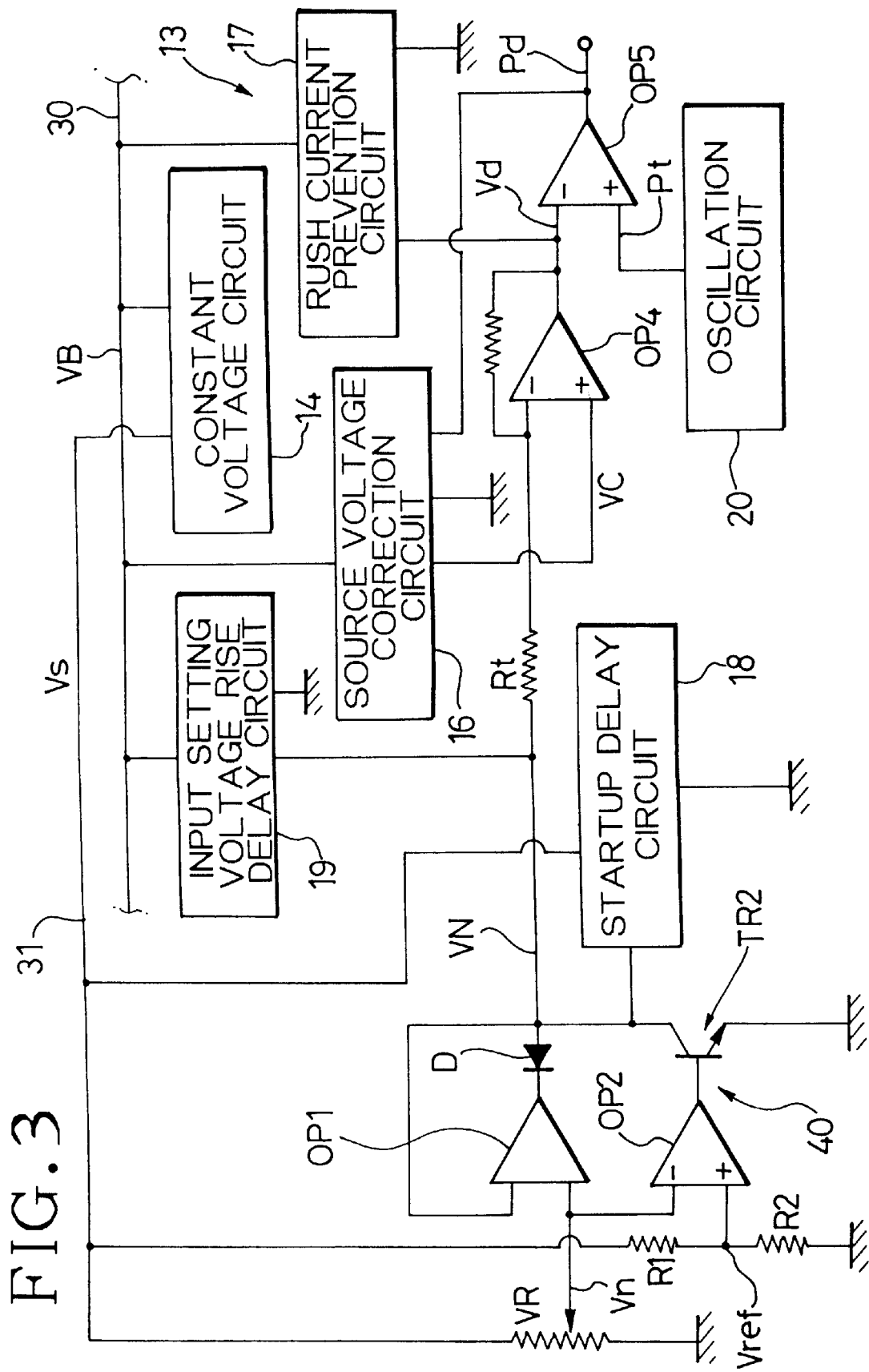
FIG. 3 is an electrical circuit diagram illustrating the remaining portion of the brushless motor control apparatus in the embodiment of the present invention.

The output duty setting circuit 13 may be structured, for instance, as shown in FIG. 3, with a source voltage VB (a rated voltage 12 V) supplied to the source line 30 which is connected to a battery source. In addition, a constant voltage circuit 14 is connected to the source line 30 so that even if the source voltage VB fluctuates, a constant voltage Vs having a constant value (preferably approximately 5 V under normal circumstances) is output to a constant voltage line 31. A sliding resistor VR, a startup delay circuit 18 and a source voltage correction circuit 16 are connected to the constant voltage line (5 V) 31.

As device for rotation rate setting that sets the rotation rate of the brushless motor, the sliding resistor VR is provided. A constant voltage Vs is applied to the two ends of the sliding resistor VR, and at a sliding terminal of the sliding resistor VR, a voltage (input setting voltage) Vn achieved by dividing the constant voltage Vs, which is in proportion to the desired rotation rate, is output. This input setting voltage Vn is input to an operational amplifier OP1 of a voltage follower, and an output setting voltage VN is output at the output side. In addition, the input setting voltage Vn is input to an inversion input terminal of an operational amplifier OP2 which constitutes a rotation start decision-making circuit 40. A voltage Vref which is achieved by dividing the constant voltage Vs at resistors R1 and R2 is input to a non-inversion input terminal of the operational amplifier OP2 as a reference voltage.

In the rotation start decision-making circuit 40, until the input setting voltage Vn reaches the reference voltage Vref during the initial stage of startup, a signal is output to a base terminal of a transistor TR2 from an output terminal of the operational amplifier OP2 to set the collector and the emitter of the transistor TR2 in a continuous state and set the output side of the operational amplifier OP1 in a continuous state with the ground, thereby setting the output setting voltage VN to 0 V. Thus, when the brushless motor is in a stopped state with the rotation setting voltage Vn set to 0 V (ground potential), the problem of the brushless motor starting to rotate with even the slightest fluctuation of the GND potential caused by noise is eliminated. The reference voltage Vref is set at a level which is higher than the range of fluctuation that could be caused by noise when the input setting voltage Vn is at the ground potential. It is to be noted that since the level of noise imposed upon the ground line is normally high in the case of a source in a vehicle, this rotation start decision-making circuit 40 is particularly crucial when the brushless motor is mounted at a vehicle.

In addition, when the input setting voltage Vn has reached the setting potential Vref, the signal at the output terminal of the operational amplifier OP2 is set to 0 V, thereby setting the collector and the emitter of the transistor TR2 in a non continuous state, and the value of the output setting voltage VN becomes equal to the value of the input setting voltage Vn to be input to an inversion input terminal of an operational amplifier OP4 via a resistor Rt.

A reference voltage Vs1, achieved by dividing the constant voltage Vs at resistors R3 and R4, is input to a non-inversion input terminal of the operational amplifier OP4, and the voltage difference between the reference voltage Vs1 and the output setting voltage VN is output from an output terminal of the operational amplifier OP4 as an output duty reference voltage Vd. This output duty reference voltage Vd and the input setting voltage Vn have an inversely proportional relationship whereby the output duty reference voltage Vd becomes high when the input setting voltage Vn is low and it becomes low when the input setting voltage Vn is high.

Figure 5A:
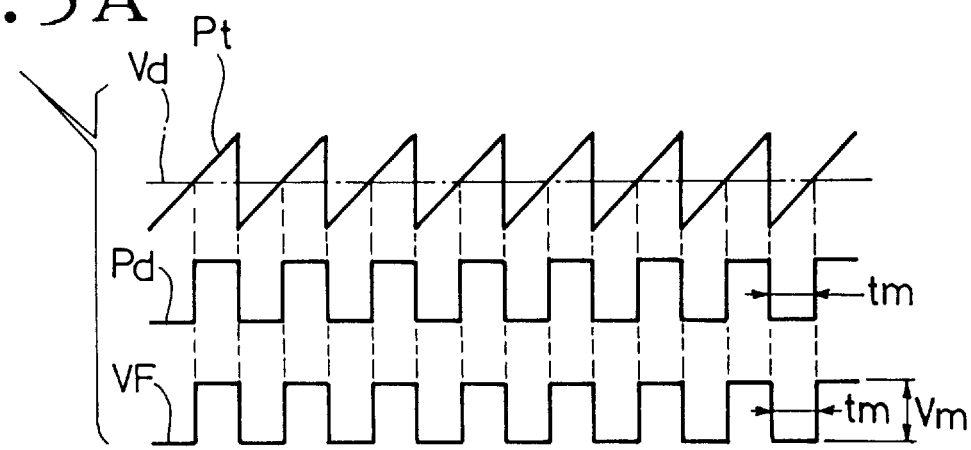
FIG. 5A, 5B and 5C present timing charts illustrating the relationships among the output duty reference voltage Vd, the triangular wave signal Pt, the output duty signal Pd and the voltage VF applied to each coil or each field effect transistor, with FIG. 5A presenting a timing chart illustrating the relationships achieved when the source voltage is a rated voltage, FIG. 5B presenting a timing chart illustrating the relationships achieved when the source voltage shifts upward and FIG. 5C presenting a timing chart illustrating the relationships achieved when the source voltage shifts downward.

The input duty reference voltage Vd is input to an inversion input terminal of an operational amplifier OP5, and a triangular wave signal Pt generated by an oscillation circuit 20 is input to a non-inversion input terminal of the operational amplifier OP5. At the operational amplifier OP5, the output duty reference voltage Vd and the triangular wave signal Pt are compared to each other, as shown in FIG. 5A, for instance, and an output duty signal Pd is output to the output signal circuit 12. As a result, when the input setting voltage Vn is low, the duty ratio of the output duty signal becomes reduced since the output duty reference voltage Vd becomes high, whereas when the input setting voltage Vn is high, the duty ratio of the output duty signal increases, since the output duty reference voltage Vd becomes low, thereby making it possible to control the rotating speed of the rotor 3 in proportion to the input setting voltage Vn.

Figure 4:
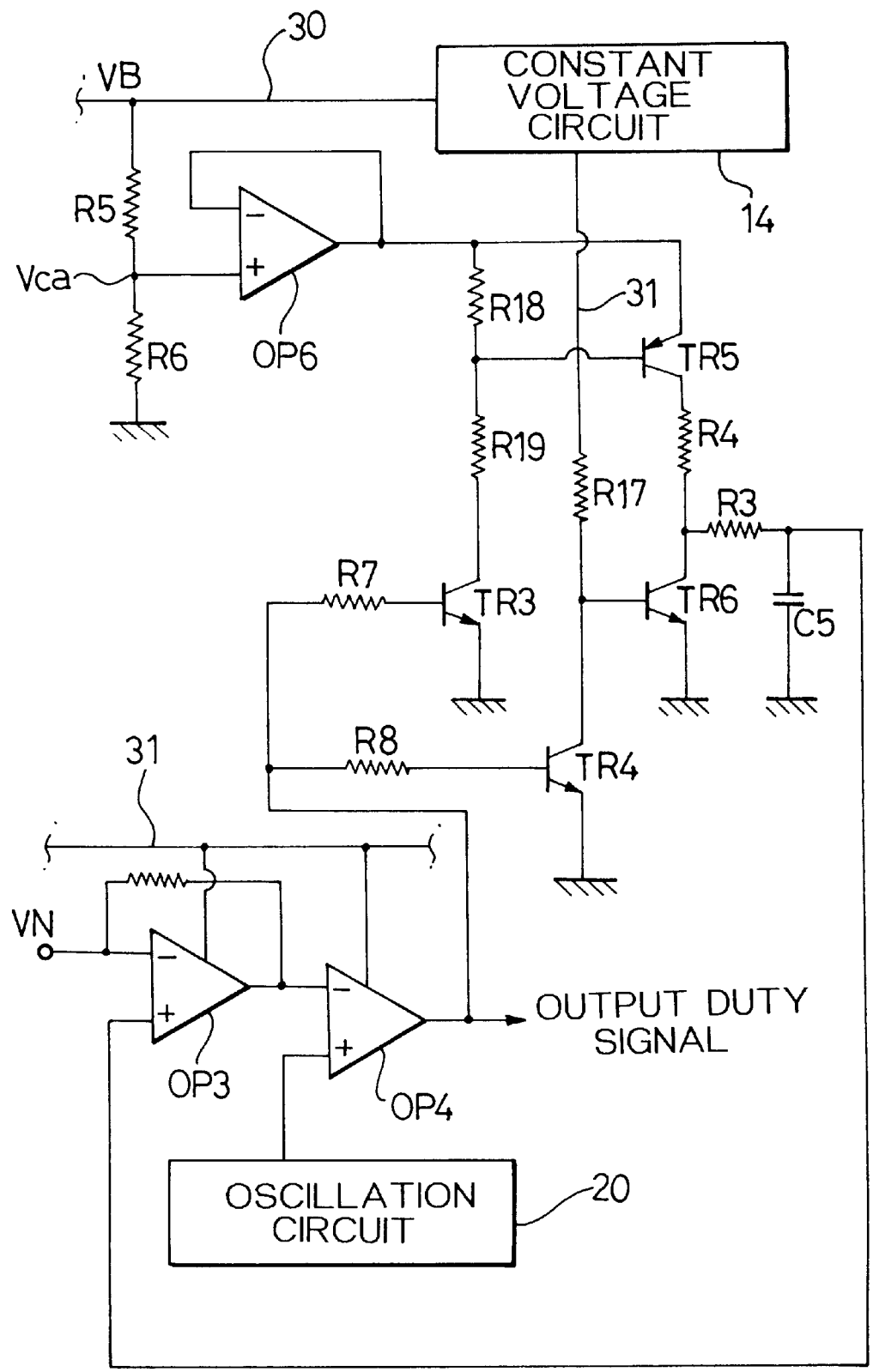
FIG. 4 is an electrical circuit diagram illustrating the source voltage correction circuit.

In addition, the source voltage correction circuit 16 is connected to the non-inverting input terminal of the operational amplifier OP4. The source voltage correction circuit 16, which may be constituted as shown in FIG. 4, for instance, is provided to prevent the fuse from melting and causing a disconnection and the motor from becoming damaged due to fluctuations of the rotation rate and the application of excess voltage caused by fluctuations in the source voltage VB.

In the source voltage correction circuit 16, a voltage Vca achieved by dividing the source voltage VB at resistors R5 and R6 is input to an operational amplifier OP6 which functions as a buffer, and the output of the operational amplifier OP6 runs to a charge / discharge circuit including transistors TR3, TR4, TR5 and TR6 and resistors R4, R7, R8, R17, R18 and R19. This charge / discharge circuit is turned on / off by the output duty signal Pd detailed below, and as the transistors TR3~TR6 are turned on / off, a capacitor C5 in an integrating circuit, including a resistor R3 and the capacitor C5, is charged to generate the source correction voltage VC at the capacitor C5.

To be more specific, when the output duty signal Pd output by the operational amplifier OP5 is set to on, the transistors TR3 and TR4 are in a continuous state between their respective collectors and emitters. This sets the transistor TR5 in a continuous state and sets the transistor TR6 in a rion-continuous state, resulting in the voltage Vca, which is in proportion to the source voltage VB, charging the capacitor C5, with the voltage (source voltage correction voltage) VC at the capacitor C5 gradually increasing in correspondence to a time constant determined by the resistor R3 and the capacitor C5 from 0 (V) to Vca (V).

In addition, when the output duty signal Pd is set to off, the transistors TR3 and TR5*[1] are in a non-continuous state, thereby setting the transistor TR5 in a non-continuous state and the transistor TR6 in a continuous state. Consequently, the electrical charge at the capacitor C5 is discharged to the ground side via the transistor TR6 and the voltage at the capacitor C5 (the source voltage correction voltage VC) becomes gradually reduced in conformance to the time constant determined by the capacities at the resistor 3 and the capacitor C5. While this source voltage correction voltage VC is turned on / off in correspondence to the on / off state of the output duty signal Pd, since the divided voltage Vca fluctuates in correspondence to fluctuations in the source voltage VB, the voltage output by the operational amplifier OP6 shifts upward when the source voltage VB becomes high and shifts downward when the source voltage VB becomes low.

The operational amplifier OP4 functioning as an inversion amplifier circuit outputs an output duty reference voltage Vd which is inverted and amplified by the output setting signal VN input to its non-inversion input terminal and the source voltage correction voltage VC input to its inversion input terminal. This output duty reference voltage Vd is input to the operational amplifier OP5 constituting a comparator where it is compared with the triangular wave signal Pt output by the oscillation circuit 20 and input to its non-inversion input terminal. Only when the value of the triangular wave signal Pt is larger than that of the output duty reference voltage Vd, is an output signal (an output duty signal Pd) output.

Figure 5B:
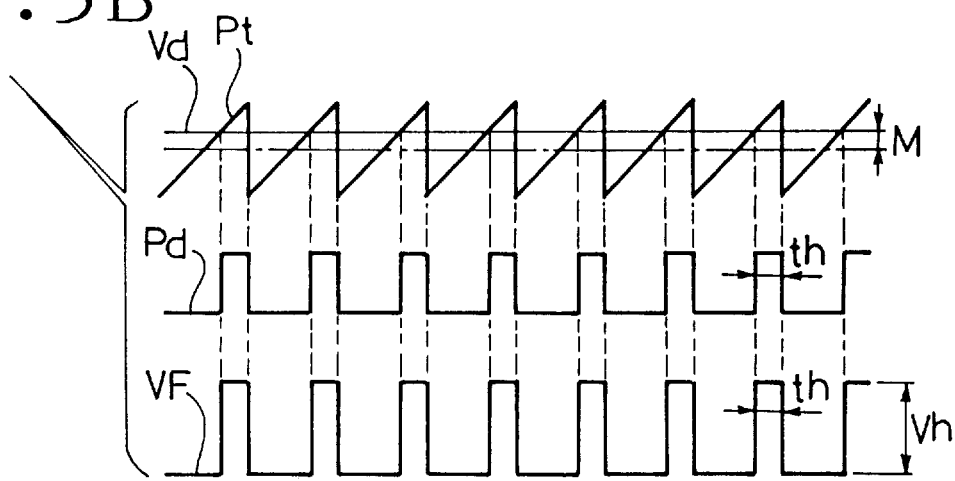
Figure 5C:
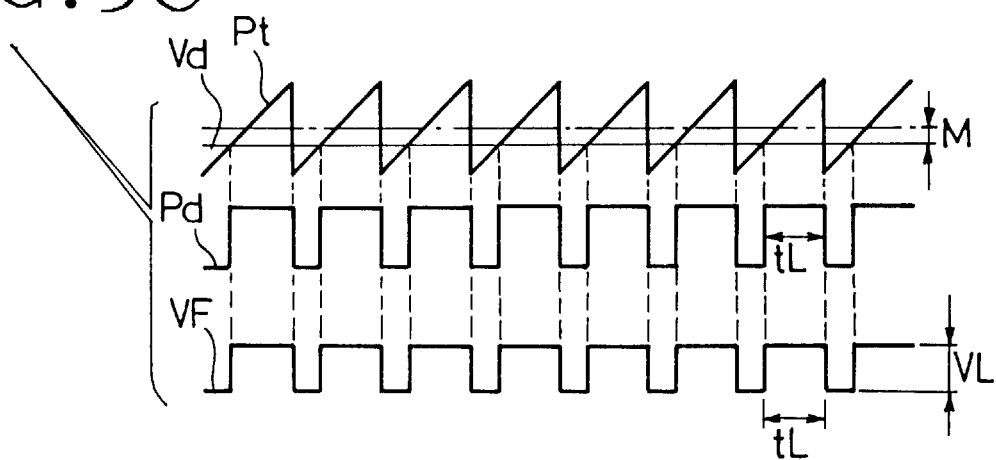

Thus, since the output duty reference voltage Vd is increased by the correction quantity M achieved through the source voltage correction voltage VC when the source voltage VB has shifted upward, as shown in FIG. 5B, the pulse width th of the output duty signal Pd becomes reduced, whereas, since the output duty reference voltage Vd is reduced by the correction quantity M achieved through the source voltage correction voltage VC when the source voltage VB has shifted downward, as shown in FIG. 5C, the pulse width tL of the output duty signal Pd can be set larger.

As a result, the voltages VF applied to the individual coils U, V and W or the individual field effect transistors FETs 1~6 will include output voltages (Vm, Vh, VL) determined in correspondence to the source voltage VB and have the pulse widths (tm, th, tL) determined in correspondence to the output duty signal Pd. The pulse widths are changed in correspondence to fluctuations in the source voltage VB so that the output voltages (Vm, Vh, VL) and pulse widths (tm, th, tL) determined by the output duty signal Pd maintain a relationship whereby the products of the output voltages (Vm, Vh, VL) and the pulse widths (tm, th, tL) are constant at all times (Vm×tm=Vh×th=VL×tL=constant). Consequently, the average voltage at the individual coils U, V and W or the individual field effect transistors, FETs 1~6 can be maintained at a constant value at all times, thereby making it possible to achieve stable rotation of the rotor 3. It is to be noted that FIG. 5A illustrates a situation in which the source voltage VB is a rated voltage (12 V), with the output voltages (Vm, Vh, VL) of the voltages VF which fluctuate in correspondence to fluctuations in the source voltage VB having a relationship expressed as Vh>Vm>VL.

Figure 6:
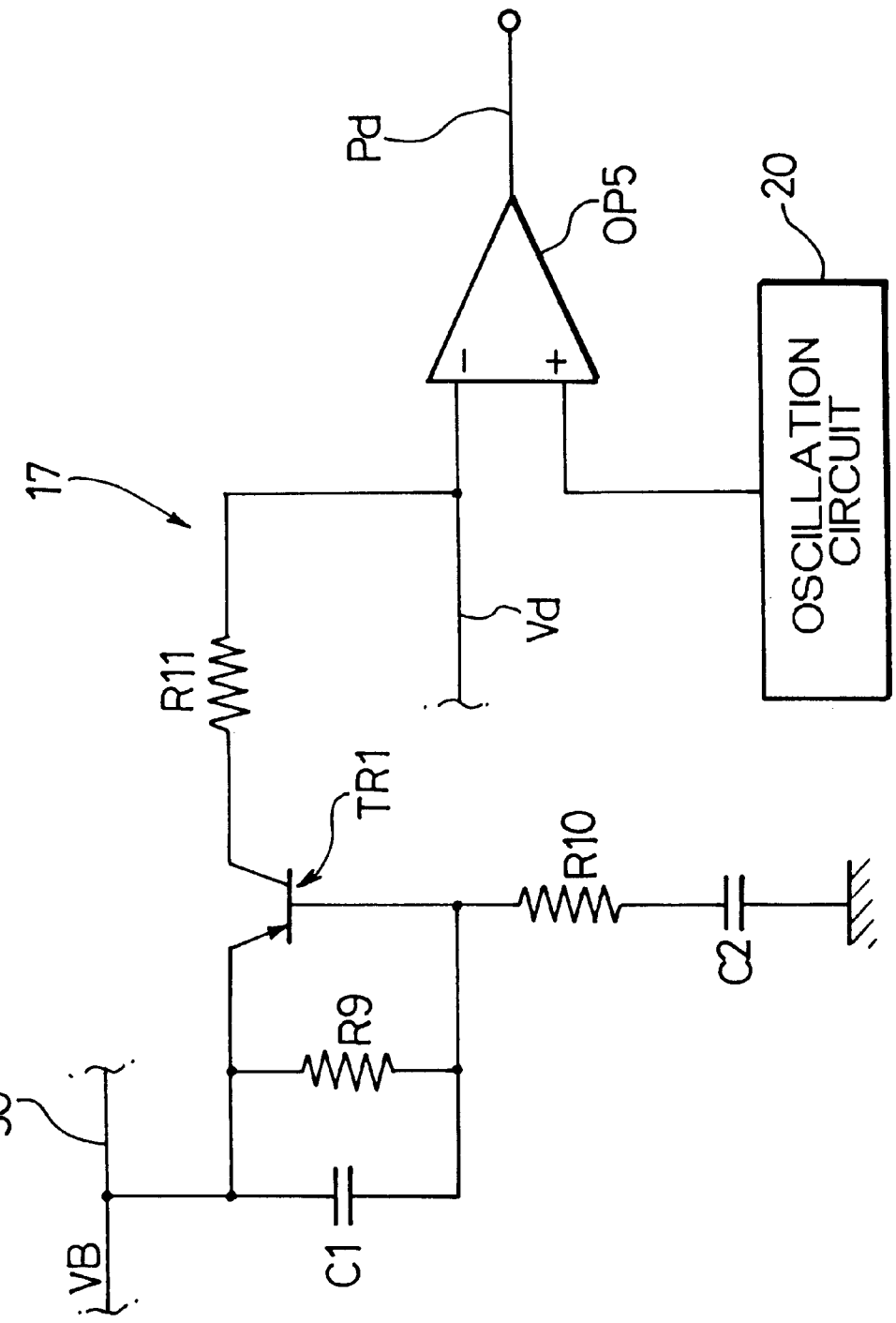
FIG. 6 is an electrical circuit diagram illustrating the rush current prevention circuit.
Figure 7:
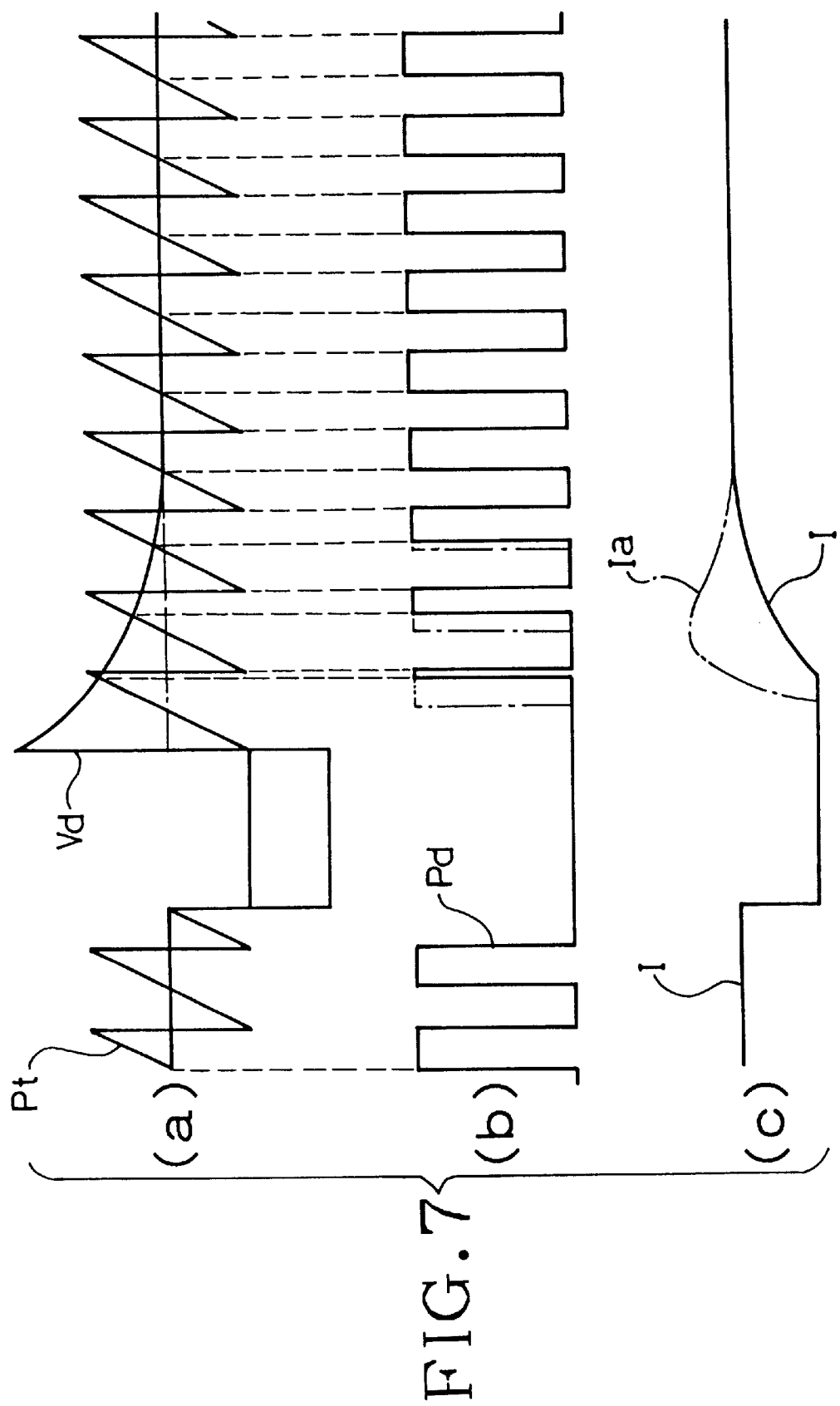
FIG. 7 presents timing charts, with FIG. 7A presenting a timing chart illustrating the relationship between the output reference voltage and the triangular wave signal Pt, FIG. 7B presenting a timing chart of the output duty signal and FIG. 7C presenting a timing chart of the current running to the coils or the field effect transistors.

The rush current prevention circuit 17, which is constituted as shown in FIG. 6, is provided to prevent the rush current which is generated when the source rises after it has been cut-off momentarily, as indicated by the one-point chain line in FIG. 7. The rush current prevention circuit 17 is provided between the source line 30 and an inversion input terminal of the operational amplifier OP5.

In the rush current prevention circuit 17, the collector of the transistor TR1 is connected to the source line 30, and a capacitor C1 and a resistor R9 are connected in parallel between the collector and the base of the transistor TR1. Furthermore, a resistor R10 and a capacitor C2 are connected between the base of the transistor TR1 and the ground, with the emitter connected to the inversion input terminal of the operational amplifier OP5 via a resistor R11.

Thus, when the source voltage VB has risen, the capacitor C1 is charged by the current supplied by the source line 30. Moreover, the capacitor C2 is also charged via the resistors R9 and R10. While the capacitors C1 and C2 are being charged, a potential is generated between the collector and the base by the resistor R9 and a potential is generated at the base by the resistor R10, thereby setting the transistor TR1 in a continuous state. With this, a voltage achieved by reducing the source voltage VB at the resistor R11 is applied to the inversion input terminal of the operational amplifier OP5. However, when the charging of the capacitors C1 and C2 is completed after the source voltage has stabilized, there will no longer be current passing through the resistors R9 and R10, which, in turn, results in no difference in potential between the collector and the base of the transistor TR1. Thus, the continuity of the transistor TR1 is cut off, and the source line 30 and the inversion input terminal of the operational amplifier OP5 become cut off from each other.

Consequently, since the output duty reference voltage Vd is suddenly set to high, as shown in FIG. 7(a), the pulse width of the output duty signal Pd at a rise after the source has been momentarily cut off can be set small, as shown in FIG. 7(b) and a rush current can be prevented from running to the FETs and the exciting coils, as shown in FIG. 7(c).

Figure 8:
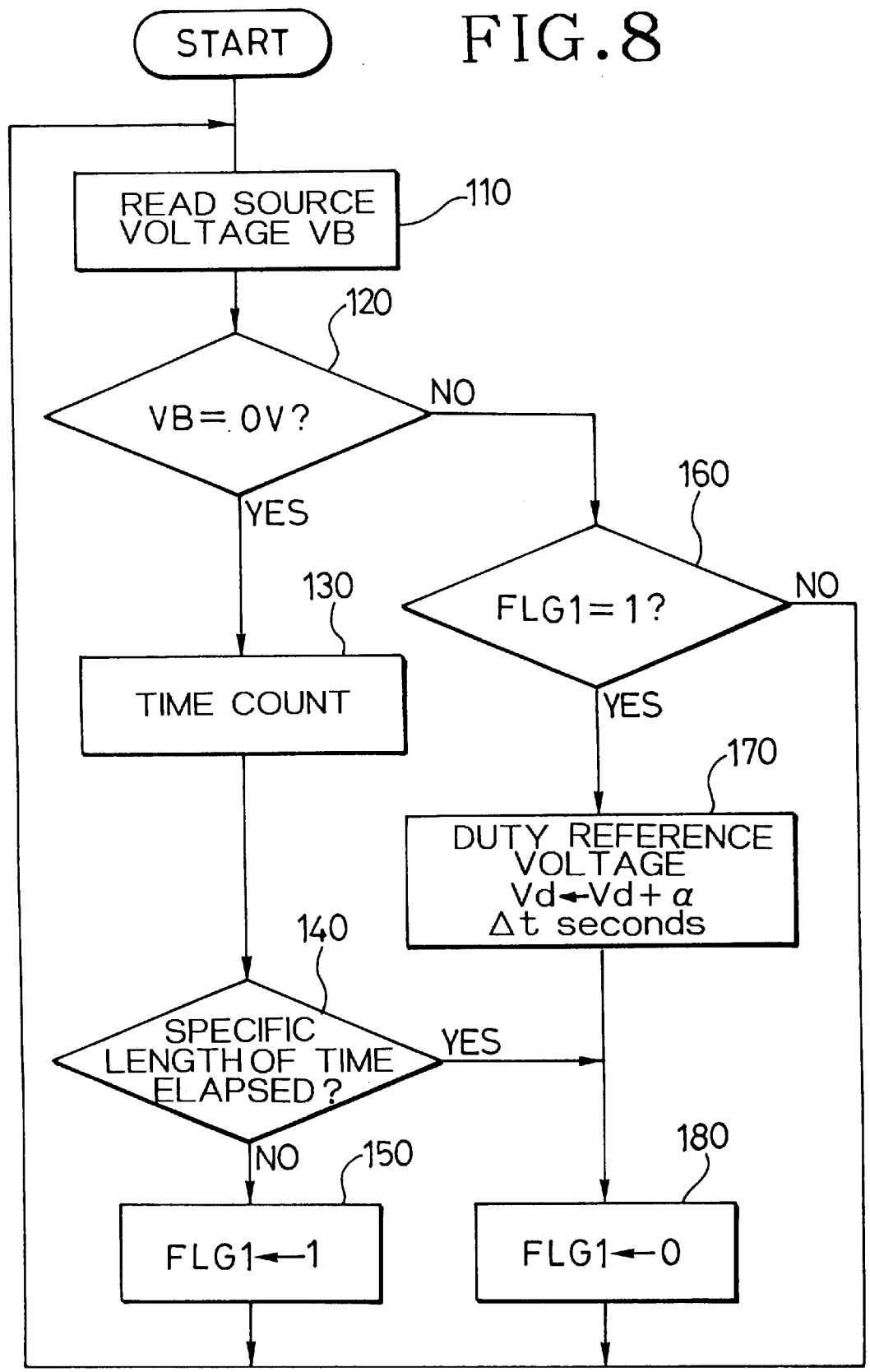
FIG. 8 is a flowchart illustrating the rush current prevention control.

If a function similar to that achieved by the rush current prevention circuit 17 is to be realized through the operation of a microcomputer, the rush current prevention control as illustrated in the flowchart in FIG. 8, for instance, may be implemented. In this rush current prevention control, first, in step 110, the source voltage VB is read. In this case, the source voltage VB is converted to a digital signal at an A/D converter, and is read into the nicrocomputer. Then, in step 120, a decision is made as to whether or not the source voltage VB that has been read is 0 V. If the source voltage VB is judged to be 0 V in this decision-making, the operation proceeds to step 130, in which the length of time over which the source voltage VB remains at 0 V is counted (time count). Then, in step 140, a decision is made as to whether or not this counted length of time has exceeded a specific length of time, and if the counted length of time is less than the specific length of time, the operation proceeds to step 150 to set (FLG1←1) a prevention flag (FLG1) before returning to step 110. After this, the source voltage VB is read again in step 110, a decision is made as to whether or not the source voltage VB is 0 V in step 120, the length of time over which the source voltage VB remains at 0 V is counted in step 130 again if the source voltage VB is determined to be at 0 V and a decision is made in regard to the length of the elapsed time in step 140. Since the source voltage VB is judged to have remained at 0 V for the specific length of time or more in this decision-making, it can be decided that the source voltage VB has not been cut off momentarily, the operation proceeds to step 180 to clear the prevention flag (FLG1←0), thereby halting the control.

If, on the other hand, the source voltage VB that has been read in step 110 is judged to be other than 0 V in the decision-making in step 120, the operation proceeds to step 160, in which a decision is made as to whether or not the prevention flag has been set (FLG1=1?). If the prevention flag has not been set, this control is halted, whereas if the prevention flag has been set, the operation proceeds to step 1270 in which a specific value α is added to the output duty reference voltage (duty reference voltage) Vd for a specific length of time, i.e., Δt seconds, to reduce the pulse width of the output duty signal Pd to prevent a rush current. Then, in step 180, the prevention flag is cleared in order to indicate completion of the rush current prevention control.

Figure 9:
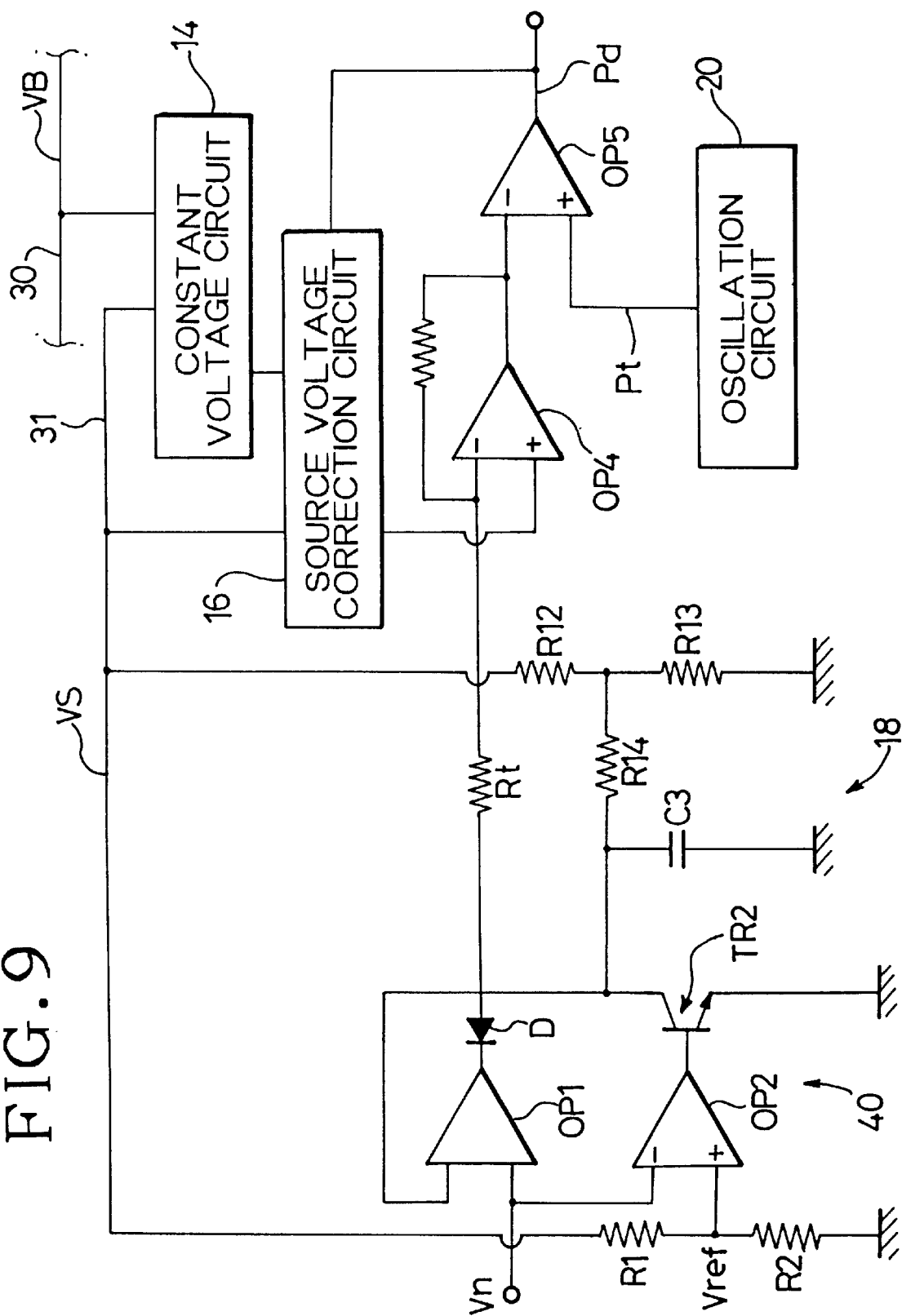
FIG. 9 is an electrical circuit diagram illustrating the startup delay circuit.

The startup delay circuit 18, which is connected between the collector of the transistor TR2 of the rotation start decision-making circuit 40 and the output terminal of the operational amplifier OP1 of the voltage follower, as shown in FIG. 9, includes a capacitor C3 which is connected in parallel to the transistor TR2, resistors R12 and R13 for dividing the voltage Vs generated by the constant voltage circuit 14 and a resistor R14 that connects the voltage dividing point of the resistors R12 and R13 to the capacitor C3.

Figure 10:
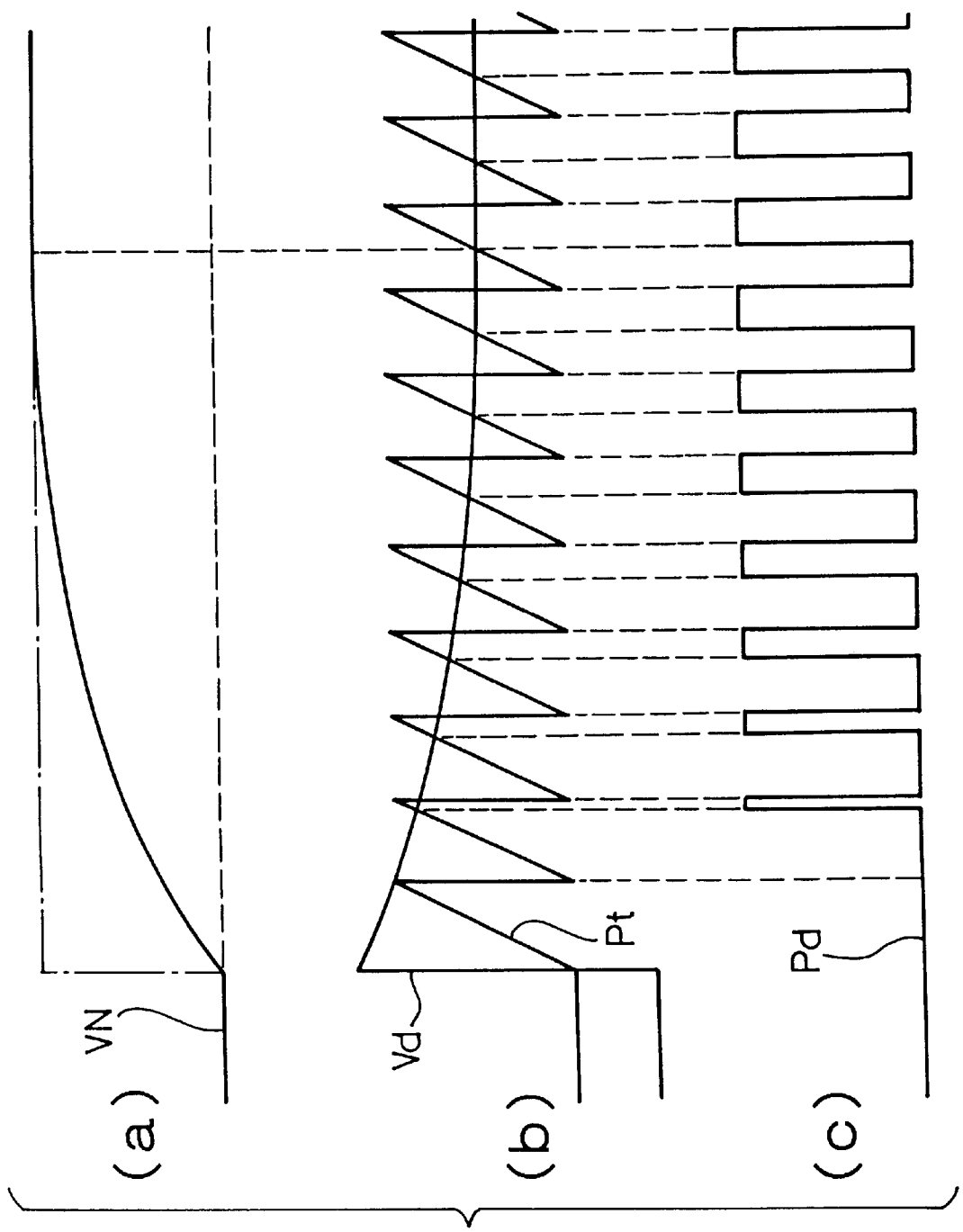
FIG. 10 presents timing charts, with FIG. 10A presenting a timing chart illustrating the delay in the output setting voltage VN, FIG. 10B presenting a timing chart illustrating the relationship between the output duty reference voltage Vd, which is caused to change by the delay in the output setting voltage VN and the triangular wave signal Pt, and FIG. 10C presenting a timing chart of the output duty signal Pd.

Thus, when rotation is judged to have started by the rotation start decision-making circuit 40 and the continuity in the transistor TR2 is cut off, the capacitor C3 is charged by using a time constant which is determined by the resistor R14 and the capacitor C3 and, consequently, at a rise of the output setting voltage VN, a delay corresponding to the time constant can be applied as shown in FIG. 10(a). As a result, since the output duty setting voltage Vd can be changed in such a manner that it is gradually lowered to the value setting, as shown in FIG. 10(b), the pulse width of the output duty signal Pd can be made to increase sequentially from 0 to a specific value at the rise, thereby smoothly increasing the rotation rate of the rotor 3.

Figure 11:
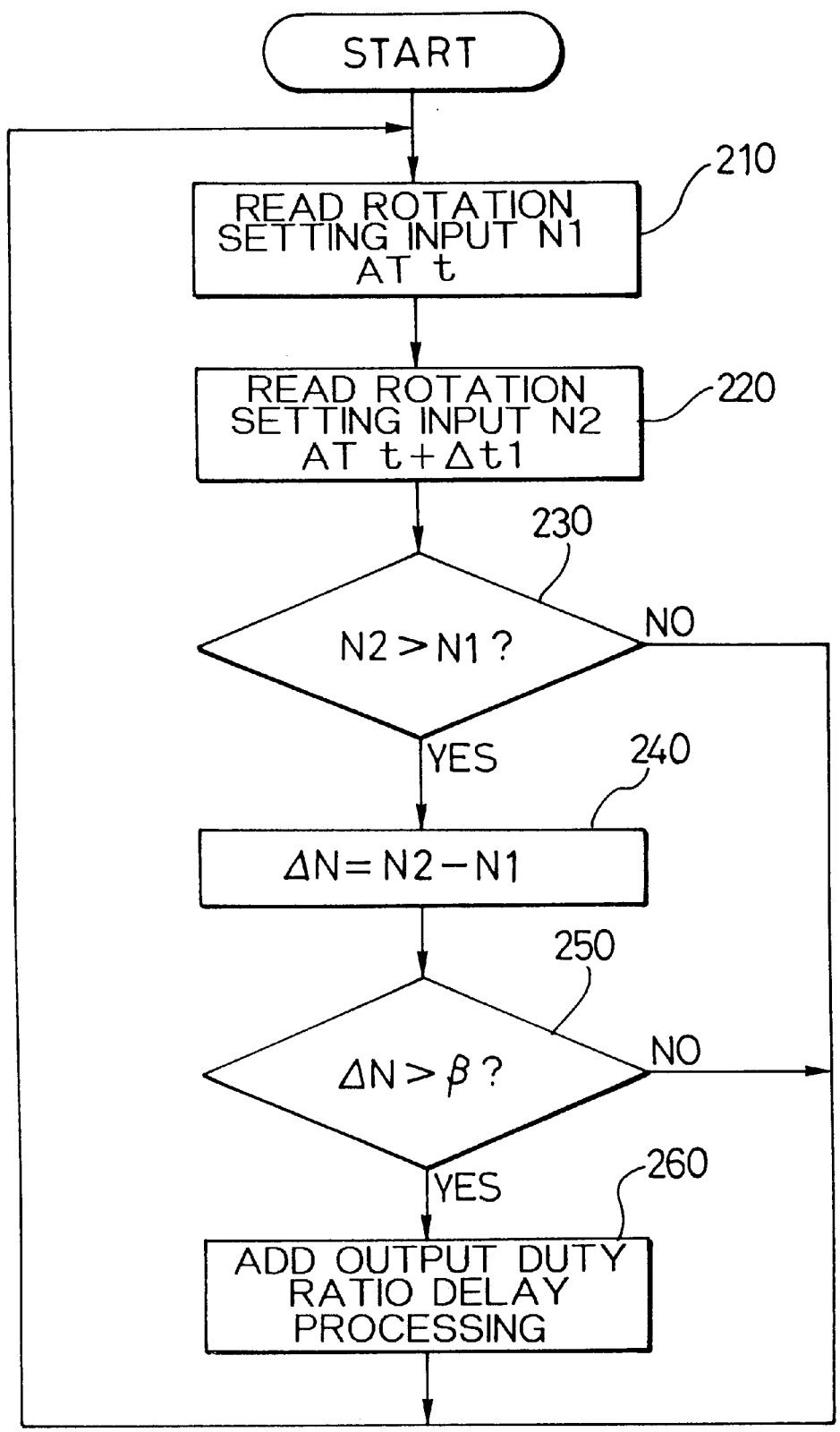
FIG. 11 is a flowchart illustrating the startup delay control.

If a function similar to that achieved by the startup delay circuit 18 is to be realized through the operation of a microcomputer, the startup delay control as illustrated in the flowchart in FIG. 11, for instance, may be implemented. In this startup delay control, first, in step 210, the rotation setting input (the preceding rotation input) N1 at a specific point in time t is read. The rotation setting input N1 is obtained by performing A/D conversion of the input setting voltage Vn corresponding to the rotation rate. Then, in step 220, the rotation setting input (the succeeding rotation setting input) N2 at a point in time which is delayed from the specific point in time t by Δt1, is read. In step 230, the preceding rotation setting input N1 and the succeeding rotation setting input N2 are compared to each other. If, in this decision-making, the preceding rotation setting input N2 is judged to be larger, it can be decided that the source is not rising and, consequently, this control is not effected.

If, on the other hand, the succeeding rotation setting input N2 is judged to be larger in the decision-making in step 230, the operation proceeds to step 240, in which the difference ΔN (ΔN=N2−N1) between the preceding rotation setting input N1 and the succeeding rotation setting input N2 is determined, and then in step 250, a decision is made as to whether or not the difference ΔN is equal to or greater than a specific value (β). Since, if the difference ΔN is greater than the specific value in this decision-making, it can be decided that the source is rising, the operation proceeds to step 260, in which a delay is applied to the output duty ratio of the output duty signal Pd to cause the pulse width to gradually increase from 0 to a specific pulse width. In addition, if the difference AN is equal to or smaller than the specific value in the decision-making in step 250, it can be decided that the voltage is not rising but the variable resistor (rotation rate setting device) VR has been changed manually, the operation exits the startup delay control. It is to be noted that while the source is determined to be rising based upon the rotation setting input in this startup delay control, a rise of the source may be detected by detecting the value of the source voltage VB instead.

Figure 13A:
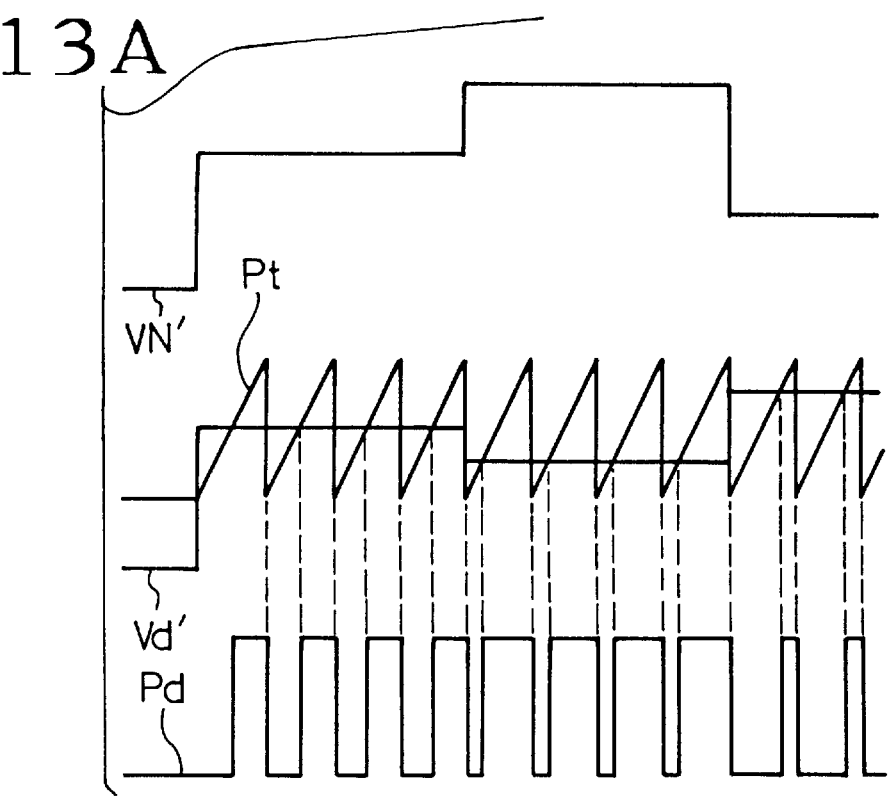
FIG. 13A presents a timing chart illustrating the relationships among the output setting voltage VN', the output duty reference voltage Vd, the triangular wave signal Pt and the output duty signal Pd achieved when no input setting voltage rise delay is applied

An input setting voltage rise delay circuit 19 is provided to eliminate problems caused by fluctuations of the input setting voltage Vn that occur when the variable resistor VR is operated, particularly at a rise. For instance, if the output setting voltage has fluctuated to VN' due to a fluctuation in the input setting voltage Vn as illustrated in FIG. 13A, the output duty reference voltage Vd, too, fluctuates to Vd', resulting in a shift in the pulse width of the output duty signal Pd. This shift occurs in steps and, in particular, in the case of a change in which the rotation rate is increased, if the pulse width is suddenly set to a large setting, a sudden change in the torque occurs at the rotor 3, thereby causing problems such as abnormal noise and inability to achieve a smooth rotating state. In order to deal with these problems, the input setting voltage rise delay circuit 19 that gradually increases the rotation rate by applying a specific delay to the output setting voltage VN when the output setting voltage VN has changed, particularly when it has shifted in the direction in which rotation rate increases, is provided. However, since it is not desirable to gradually reduce the rotation rate when the output setting voltage VN drops, as this results in a disruption of the rotation of the rotor 3 through inertia, the input setting voltage rise delay circuit 19 does not apply a delay when the input setting voltage falls.

Figure 12:
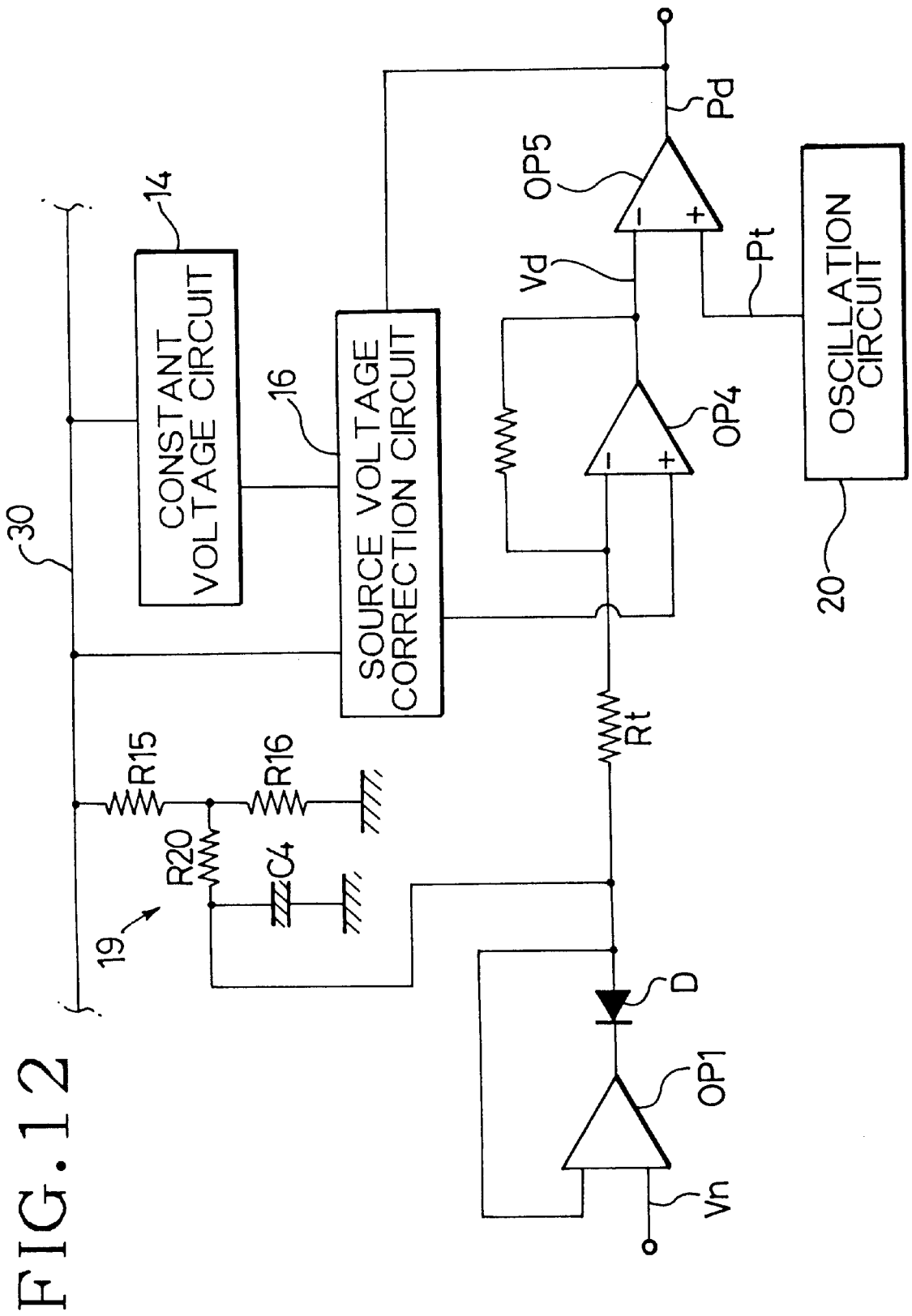
FIG. 12 is an electrical circuit diagram illustrating the input setting voltage rise delay circuit.

The input setting voltage rise delay circuit 19, which is connected to the output terminal of the operational amplifier OP1, as shown in FIG. 12, for instance, includes resistors R15 and R16 for dividing the source voltage VB and a capacitor C4 that is connected in parallel to the resistor R16, with the line connecting the voltage dividing point of the resistors R15 and R16 to the capacitor C4 connected to the output side of the operational amplifier OP1. Thus, as shown in FIG. 13B, when the input setting voltage Vn increases to increase the output setting voltage VN, the capacitor C4 becomes charged, which results in a specific delay being applied to the output setting voltage VN, whereas when the output setting voltage VN is falling, the electrical charge at the capacitor C4 is rapidly discharged from the operational amplifier OP1 via a diode D, thereby achieving a rapid reduction in the output setting voltage VN.

Figure 13B:
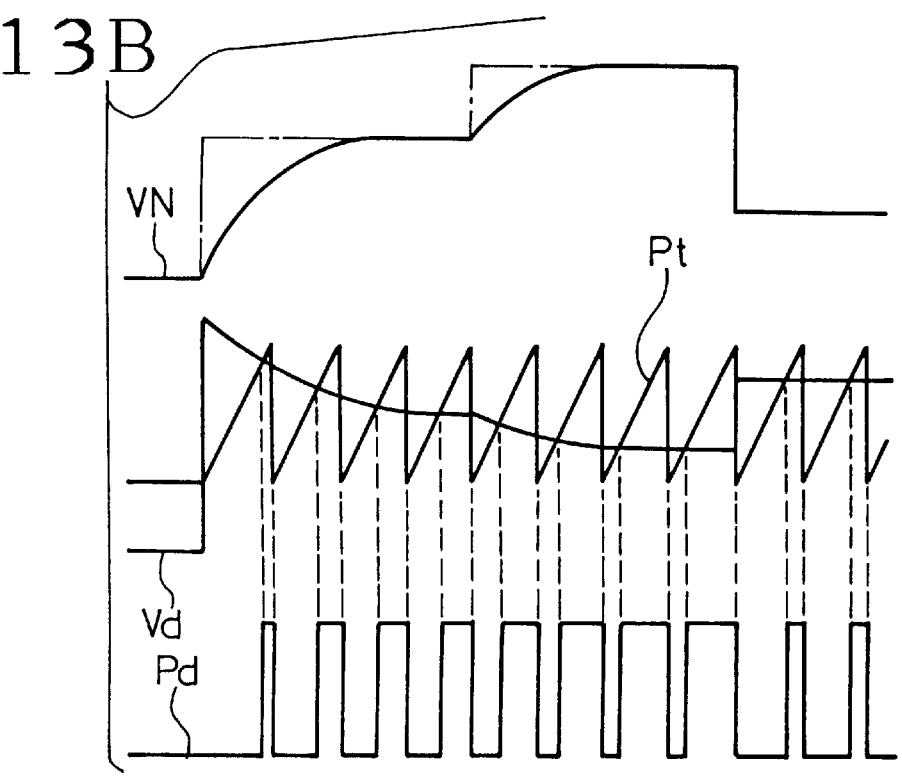
FIG. 13B presents a timing chart illustrating the relationships among the output setting voltage VN', the output duty reference voltage Vd, the triangular wave signal Pt and the output duty signal Pd achieved when the input setting voltage rise delay is applied.

With this, since the output duty reference voltage Vd can be changed as illustrated in FIG. 13B, the pulse width of the output duty signal Pd gradually increases until it reaches a specific value if the rotation rate is increasing, whereas the pulse width can be set so that it becomes reduced to a specific value at once when the rotation rate is decreasing. It is to be noted that, while there is a specific time delay in the increase of the input setting voltage Vn, since the operational amplifier OP1, which functions as the voltage follower, also has a function as a buffer, the waveform is shaped so that the rise of the output setting voltage VN is roughly vertical.

Figure 14:
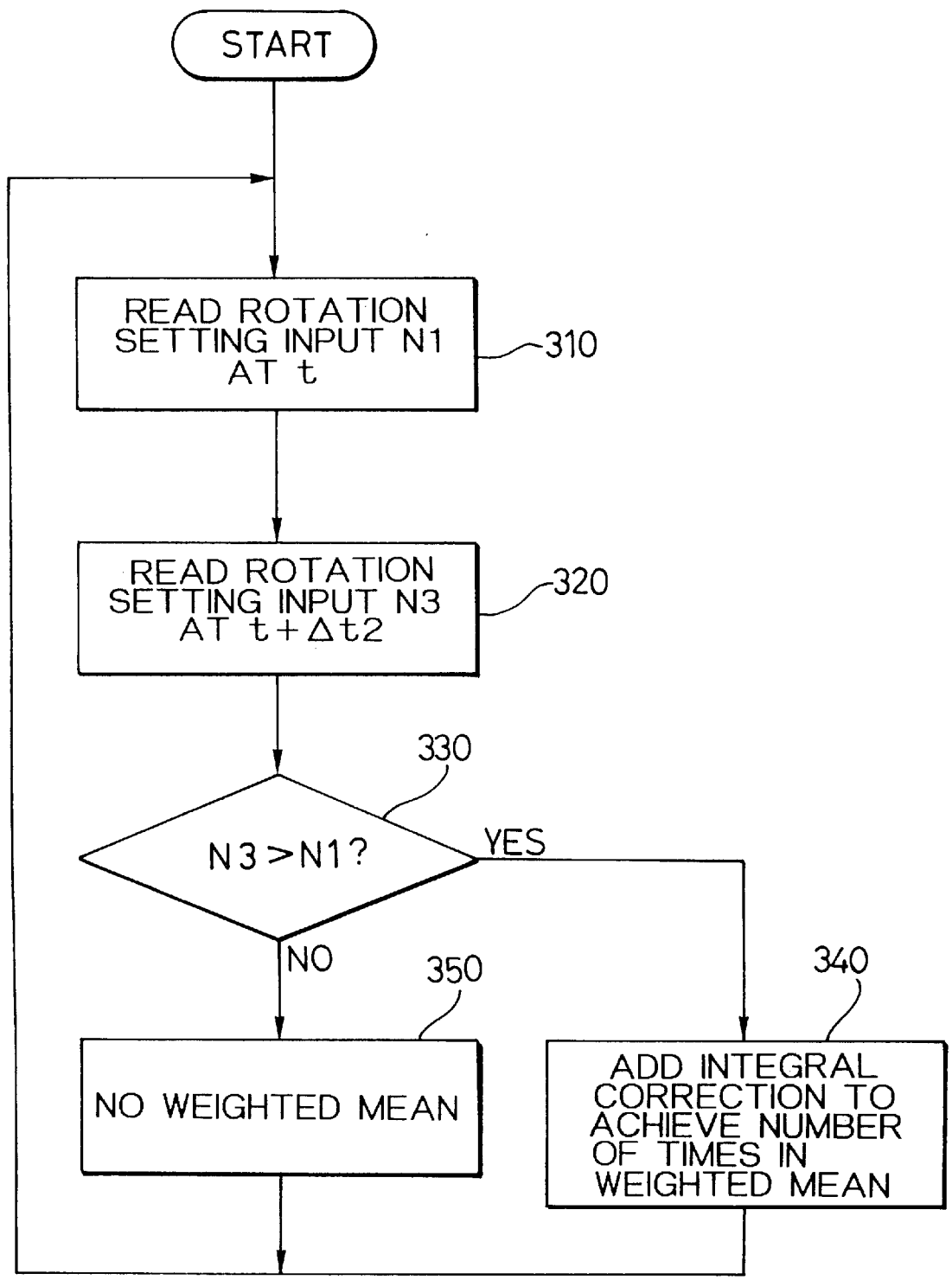
FIG. 14 is a flowchart illustrating the input setting voltage rise delay control.

If a function that is similar to that achieved by the input setting voltage rise delay circuit 19 is to be realized through the operation of a microcomputer, the input setting voltage rise delay control, as illustrated in the flowchart in FIG. 14, for instance, may be implemented. In this input setting voltage rise delay control, first, in step 310, the rotation setting input (the preceding rotation setting input) N1 at a specific point in time t is read. The rotation setting input NI is obtained by performing A/D conversion of the input setting voltage Vn corresponding to the rotation rate. Then, in step 320, the rotation setting input (the succeeding rotation setting input) N3 at a point in time that is delayed from the specific point in time t by Δt2 is read. It is to be noted that, while this Δt2 may be the same as Δt1 used in step 220 explained earlier, Δt2 may also be set longer than Δt1 if the rate of change in the input setting voltage Vn is determined to be smaller than the rate of change in the case explained earlier.

Then, in step 330, the preceding rotation setting input Ni and the succeeding rotation setting input N3 are compared to each other. If, in this decision-making, the preceding rotation setting input Ni is judged to be larger, it is decided that the input setting voltage Vn has been lowered, and thus, the operation proceeds to step 350 to ensure that the delay processing is not performed (no weighted average). If, on the other hand, the succeeding rotation setting input N3 is judged to be larger in the decision-making in step 350, it is decided that the change in the input setting voltage Vn represents a rise, and the operation proceeds to step 340, in which a specific delay is applied by adding an integral correction to the output setting voltage VN (weighted average with a large number of instances). With this, since the output duty reference voltage Vd can be made to increase only when the input setting voltage Vn increases, a control whereby the rotation rate is sequentially increased is performed when the rotation rate is to be increased, is achieved and a control whereby the rotation rate is decreased at once when the rotation rate is to be reduced, is achieved, thereby assuring smooth rotation control of the rotor 3.

As has been explained, according to the present invention, since, when the rotor rotation rate is to undergo a large upward change, the pulse width of the drive pulse is gradually increased by the means for pulse width gradual increase to shift to the pulse width that corresponds to the rotation rate setting signal, negative factors that may degrade the performance of the motor such as a rush current and abnormal noise caused by a sudden increase in the rotation rate of the rotor can be suppressed.

In addition, according to the present invention, when the source rises after it has been cut off temporarily, the pulse width of the drive pulse is contracted, thereby preventing a sudden large current from running to the exciting coils to prevent generation of a rush current by achieving a gentle rise of the exciting current. Furthermore, according to the present invention, since the pulse width of the drive pulse gradually increases from a 0 state (duty ratio=0%) until it reaches the width that corresponds to the rotation rate setting at a startup, change in the rotation rate of the rotor, i.e., change in the power supply to the exciting coils at a startup can be made gentler, thereby preventing generation of magnetic sound. Moreover, according to the present invention, since, when the setting for the rotation rate is increased, the pulse width of the drive pulse gradually increases from the state before the change in the setting until it reaches the pulse width that corresponds to the rotation rate after the change in the setting, the motor sound can be prevented from becoming abnormally loud.

In addition, since the present invention achieves countermeasures against noise and fluctuation of the GND voltage, the motor can be prevented from rotating unnecessarily before a startup.

Furthermore, according to the present invention, since, when the setting for the rotation rate is reduced, the pulse width of the drive pulse is changed instantly from the state before the change in the setting until it reaches the pulse width that corresponds to the rotation rate after the change in the setting, the rotor can be caused to rotate through inertia until it reaches the rotation rate after change in the setting, thereby preventing generation of motor noise, which might apply a braking effect on the rotation of the rotor.

What is claimed is:

1. A drive control apparatus comprising:
   a brushless motor including, a rotor having permanent magnets, a stator provided at a position facing opposite said permanent magnets of said rotor, exciting coils wound around said stator operable to generate a rotating magnetic field, and a detector operable to detect a position of said rotor;
   means for switching the direction of a current supplied to said exciting coils;
   rotation rate setting means for setting a rotation rate for said rotor and for generating a setting signal;
   pulse-width modulation means for determining a pulse width of a drive pulse based upon the setting signal from said rotation rate setting means;
   a drive controller operable to perform switching control of said means for switching by using an output signal from said detector and the drive pulse having the pulse width determined by said pulse-width modulation means; and
   pulse width gradual increase means for gradually and greatly changing the pulse width of the drive pulse until the pulse width is equal to the pulse width determined by said pulse-width modulation means by using a specific time constant when the rotation rate of said rotor increases suddenly.

2. A drive control apparatus according to claim 1, wherein:
   said pulse width gradual increase means is operable for gradually and greatly changing the pulse width of the drive pulse until the pulse width is equal to the pulse width determined by said pulse width modulation means by using the specific time constant when the rotation rate of said rotor is set for an increase by said rotation rate setting means.

3. A drive control apparatus according to claim 1, wherein:
   said pulse width modulation means includes an oscillator operable to generate an oscillation pulse having a specific frequency and a drive pulse formation device operable to form a drive pulse by using the oscillation pulse from said oscillator and a threshold value corresponding to the setting signal from said rotation rate setting means;
   wherein said drive pulse formation device is operable for changing the threshold value in correspondence to the setting signal from said rotation rate setting means, and to modulate the pulse width of the drive pulse according to the changing of the threshold value.

4. A drive control apparatus according to claim 3 for use with a source having an output, wherein:
   said pulse width gradual increase means is operable for gradually and greatly changing the pulse width of the drive pulse until the pulse width is equal to the pulse width determined by said pulse width modulation means by using the specific time constant during a rise of the output of the source which has been temporarily cut off.

5. A drive control apparatus according to claim 4, wherein:
   said pulse width gradual increase means is operable to suddenly raise the threshold value in the direction in which the pulse width becomes narrower at the rise of the output of the source that has been temporarily cut off, and then to gradually change the threshold value to a level corresponding to the setting signal by using a specific time constant.

6. A drive control apparatus according to claim 5, wherein:
   said oscillator is operable to generate the oscillation pulse as a triangular wave, and said pulse-width modulation means is operable for comparing the oscillation pulse to the threshold value corresponding to the setting signal of said rotation rate setting means and for selecting as the pulse width a period of the triangular wave over which the level thereof exceeds the threshold value.

7. A drive control apparatus according to claim 3, wherein:
   said oscillator is operable to generate the oscillation pulse as a triangular wave, and said pulse-width modulation means is operable for comparing the oscillation pulse to the threshold value corresponding to the setting signal of said rotation rate setting means and for selecting as the pulse width a period of the triangular wave over which the level thereof exceeds the threshold value.

8. A drive control apparatus according to claim 7, further comprising:
   pulse width contraction means for determining when the rotation rate setting is reduced, and for instantly changing the pulse width of the drive pulse from the level before the change in the setting to the level after the change in the setting.

9. A drive control apparatus according to claim 8, wherein:
   when the setting for the rotation rate is increased, said pulse width gradual increase means is operable to change the threshold value from a level before the change in the setting to a level after the change in the setting by using a specific time constant; and
   when the setting for the rotation rate is reduced, said pulse width contraction means is operable to instantly change the threshold value from the level before the change in the setting to the level after the change in the setting.

10. A drive control apparatus according to claim 3, wherein:
    said pulse width gradual increase means is operable for gradually and greatly changing the pulse width of the drive pulse until the pulse width is equal to the pulse width determined by said pulse width modulation means by using the specific time constant during an initial stage at startup.

11. A drive control apparatus according to claim 10, wherein:

said pulse width gradual increase means is operable to suddenly change the threshold value to a level at which the pulse width is zero and to then gradually change the threshold value to a level corresponding to the setting signal by using a specific time constant during the initial stage of startup.

12. A drive control apparatus according to claim 11, wherein:

said oscillator is operable to generate the oscillation pulse as a triangular wave, and said pulse-width modulation means is operable for comparing the oscillation pulse to the threshold value corresponding to the setting signal of said rotation rate setting means and for selecting as the pulse width a period of the triangular wave over which the level thereof exceeds the threshold value.

13. A drive control apparatus according to claim 12, wherein:

said pulse width gradual increase means is operable to set the level of the threshold value at or over a peak of the triangular wave and to then gradually change the level to a level corresponding to the setting signal by using a specific time constant at a rise of a source at a startup.

14. A drive control apparatus according to claim 3, further comprising:

pulse width contraction means for determining when the rotation rate setting is reduced, and for instantly changing the pulse width of the drive pulse from the level before the change in the setting to the level after the change in the setting.

15. A drive control apparatus according to claim 1 for use with a source having an output, wherein:

said pulse width gradual increase means is operable for gradually and greatly changing the pulse width of the drive pulse until the pulse width is equal to the pulse width determined by said pulse width modulation means by using the specific time constant during a rise of the output of the source which has been temporarily cut off.

16. A drive control apparatus according to claim 1, wherein:

said pulse width gradual increase means is operable for gradually and greatly changing the pulse width of the drive pulse until the pulse width is equal to the pulse width determined by said pulse width modulation means by using the specific time constant during an initial stage at startup.

17. A drive control apparatus according to claim 1, wherein:

the setting signal output by said rotation rate setting means is a rotation rate setting voltage that is in proportion to the rotation rate; and said drive control apparatus further comprises rotation start decision-making means for setting the rotation rate setting voltage to a stopped-state voltage when said brushless motor is in a stopped state, and for setting a rotation start decision-making voltage from the stopped-state voltage equal to or exceeding a noise voltage and forming the drive pulse only when the rotation rate setting voltage exceeds the rotation start decision-making voltage.

18. A drive control apparatus according to claim 1, further comprising:

pulse width contraction means for determining when the rotation rate setting is reduced, and for instantly changing the pulse width of the drive pulse from the level before the change in the setting to the level after the change in the setting.

* * * * *